May 8, 1928. 1,668,715

H. C. HARRISON

POWER TRANSMISSION MECHANISM

Filed Jan. 23, 1926 2 Sheets-Sheet 1

Inventor

Herbert C. Harrison

By Spencer, Sewall & Hardman,

Attorneys

May 8, 1928. 1,668,715
H. C. HARRISON
POWER TRANSMISSION MECHANISM
Filed Jan. 23. 1926 2 Sheets-Sheet 2

Inventor
Herbert C. Harrison

By Spencer, Suvall & Hardman
Attorneys

Patented May 8, 1928.

1,668,715

UNITED STATES PATENT OFFICE.

HERBERT C. HARRISON, OF LOCKPORT, NEW YORK; FLORENCE M. HARRISON, ARTHUR BRIDGES BRANFIL HARRISON, AND WILLIAM WHITMORE CAMPBELL, EXECUTORS OF SAID HERBERT C. HARRISON, DECEASED, ASSIGNORS TO GENERAL MOTORS CORPORATION, OF DETROIT, MICHIGAN, A CORPORATION OF DELAWARE.

POWER-TRANSMISSION MECHANISM.

Application filed January 23, 1926. Serial No. 83,316.

In British Patent No. 185,022, dated August 31, 1921, granted to George Constantinesco, there is disclosed a method and mechanism for transmitting power from a prime mover to a driven member, such as a secondary shaft that is to be rotated against variable resistance torque, by splitting the force exerted by the prime mover into two parts, one of which is utilized to oscillate a mass and the other to drive the driven member in one direction through the intermediary of one or more ratchet or analogous one-way clutches, each of which, when reciprocated, or oscillated, grips the driven member during one phase of movement and releases it during the other.

Automatic variable speed transmission mechanisms of the inertia type embodying the principle utilized in the Constantinesco transmission comprise a prime mover, which may be an internal combustion engine; a member to be driven by the prime mover, which may be a shaft rotatable against variable resistance; a floating lever, an inertia mass, which mass may be supported by the lever or connected to it so as to oscillate about some point exterior to the lever, said floating lever having a connection at another point to a moving part of the prime mover so as to be oscillated thereby, and at a third point to a double acting one-way clutch or ratchet device arranged to drive the driven member unidirectionally.

The inertia mass of the described mechanism may be said to comprise a floating fulcrum for the floating lever, which assumes different positions with respect to some stationary point in the prime mover. The point on the lever connected to a moving part of the prime mover is the point of application of the effort and may have a movement of uniform amplitude; the other point connected to the one-way clutch or clutches is the point of application of the resistance to be overcome in the doing of useful work and has an amplitude of movement that increases as that of the mass decreases, and decreases as that of the mass increases.

In applications of the Constantinesco transmission to at least some uses, such as motor vehicle transmissions, it has been deemed necessary to stabilize the mechanism by limiting the movement of the inertia mass and coincidentally of that point on the floating lever that is connected to the resistance to be overcome, namely to one-way clutches from which a driven member is operated. For this purpose Mr. Constantinesco has employed stabilizing springs. The use of a stabilizing spring introduces considerable practical difficulty. When the prime mover is driving the secondary shaft or other driven member, and is utilizing sufficient power to limit the amplitude of the oscillations of the inertia mass within a desirable range, the work of the stabilizing spring is relatively easy; but under conditions such that the secondary shaft or other driven member is using so little power that it tends to over-run the prime mover, then the amplitude of oscillation of the inertia mass becomes objectionably great just at the time when least power is required. Consequently, the problem of stabilizing by springs, at least with the substantially instant response that is needed, becomes difficult. In stabilizing by springs resistance is applied to oscillation of the weight and floating lever when the work furnishes adequate resistance, as well as when the resistance of the work is inadequate.

A principal object of this invention is to stabilize a transmission mechanism of the class described, only when the work is insufficient to stabilize it, and to limit the oscillations only at the end of a maximum movement. Other objects are to balance a mechanism of this type in order to reduce vibration; to arrange the transmission on motor vehicles in such manner as to supplant the customary differential; to exert automatically the stronger driving effort upon that traction wheel which has the better tractive engagement with the road, and otherwise to adapt the transmission for practical use in automobiles.

The invention contemplates the stabilization of the described oscillatory inertia mass and floating lever by connecting the inertia mass, or the floating lever moving in unison with it, to points fixed with respect to some fixed point in the prime mover by flexible linkages comprising connecting rods and two oscillatory arms or disks, adapted to oscillate about axes respectively disposed on opposite sides of said mass or lever in response to the oscillations of the latter, and also to one or more secondary shafts or other driven members through one or more intermediary ratchet or one-way clutch devices, which may, if preferred, comprise one or both of said arms or disks as the oscillatory member or members of the clutch or clutches. The oscillatory arms or disks are connected at points remote from their axes to the connecting rods, the other ends of which are joined to the inertia mass or floating lever. The proportion and arrangement are such that either linkage, comprising a connecting rod and an oscillatory arm or disk, may be brought into a position with the connecting rod in a straight line intersecting the axis of the oscillatory arm or disk, while the other connecting rod extends in a direction to one side or the other of the axis of the oscillatory arm or disk. When either linkage is fully extended so that the points of connection of the connecting rod to the floating lever and to the arm or disk and the axis of the latter are in a straight line, it is obvious that the oscillation of the mass or lever is limited in one direction or the other, but that the arm or disk may oscillate beyond the straight line position. So the oscillation of the mass or lever is restricted to a definite maximum amplitude.

In the embodiment described hereinafter, the limiting linkage comprising the described arms or disks and connecting rods constitute, respectively, the oscillatory members of one-way clutches and a part of the means for oscillating them, while the shafts on which the arms or disks oscillate are one-way driven shafts rotating towards each other, each of which drives, independently, the respective traction wheels of an automobile. The floating lever is disposed midway between said shafts and is oscillated by the crank shaft of an internal combustion engine.

In the accompanying drawings, in which like parts are indicated by like reference characters throughout the several views.

In the diagrams, Figs. 1 to 4, A indicates a prime mover shaft; B and C secondary shafts whose axes are fixed with respect to the axis of the prime mover shaft; D an inertia mass, fixed to one end of floating lever H, which is pivoted at G to an eccentric or crank pin on the prime mover shaft. From the point E on floating lever H, two connecting rods, I and I', extend to the pivotal points F and F', on the arms J and J', respectively, which oscillate about axes concentric with shafts B and C. K and K' may be free wheels, rigid or integral with arms J and J', having some inertia. A one-way clutch may be embodied in one or both arms J J' or wheels K, K' (if such are used), in the event that either or both of said shafts B and C are to be driven shafts, as is preferred; or there may be a separate driven shaft (not shown), having a single or double acting one-way clutch driven from the lever H.

In the diagrams, Figs. 1 to 4, for the purpose of the following explanation, B and C may be considered as shafts rotated towards each other by one-way clutches housed in wheels, K, K'.

Figure 1:
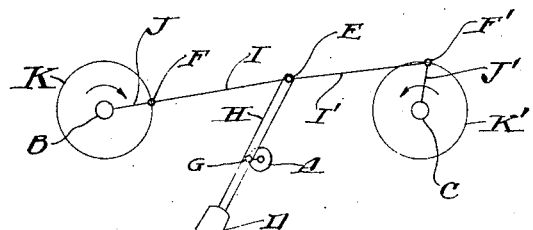
Figs. 1 to 4 are diagrams of a variable speed transmission mechanism of the inertia type illustrating positions possible to be assumed by the parts in various extreme positions of a driving eccentric rotated by some prime mover.

Fig. 1 shows the extreme limit of motion of the inertia mass B to the left and of the point E to the right when eccentric or crank G of the prime mover shaft A is in the extreme left hand position. The members J and I of the linkage are now in a straight line from the point E to axis of shaft B. As it is not capable of further extension, linkage J I limits the swing of the inertia mass to the left. When the oscillation reverses linkage J I may assume any one of three positions: it may (1) remain "on dead center" extended to the limit, with point F in a straight line with point E and axis of B, in which case the unidirectional motion would be applied only to shaft C by reason of the subsequent movement of the lever lengthwise; (2), point F may move downward during further movement of the lever, in which case shaft B will continue to rotate, connecting rod J then acting under compression; or (3), point F may pass upwards, returning on its path, in which case, the clutch being free, shaft B will not be rotated.

Figure 2:
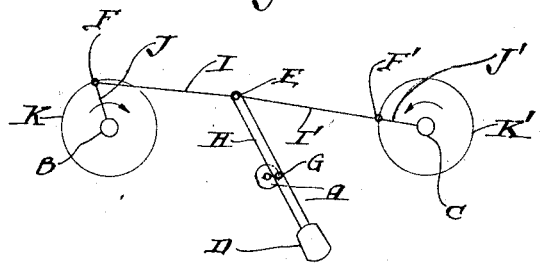

Fig. 2 shows the eccentric G 180° from its position in Fig. 1, and the point F having returned upward on its path without rotating the shaft B, as assumed with respect to position (3) in the preceding paragraph. In this operation shaft C is rotated counter clockwise, as the one-way clutch on it grips in that direction.

So long as the amplitude of oscillation of inertia mass D and other conditions are such that after straightening or nearly straightening, either of the linkages J, I, or J' I', may flex upward at points F or F', both shafts B and C will continue to rotate, each always in one direction, but in opposite directions with respect to each other, by reason of the oscillations of arms J, J', within the upper arc of possible angular movement and the consequent alternate gripping and releasing of the one-way clutches. In this operation the connecting rods are operating in tension, and the amplitude of the strokes are in inverse ratio to the amplitude of oscillations of inertia mass D.

Figure 3:
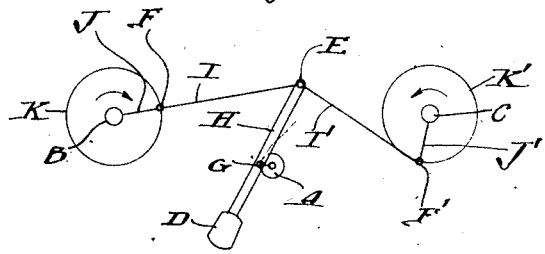

If, however, the amplitude of oscillation of mass D becomes so great, in conjunction with other conditions, that linkage J' I' passes "dead center" downward, that is, if point F' passes below a straight line joining point E with the axis of shaft C, then, with eccentric G and mass D to the left as shown in Fig. 3, linkage J' I' will be flexed downward and connecting rod I' will continue to rotate shaft C, counterclockwise, the connecting rod I' being under compression.

Figure 4:
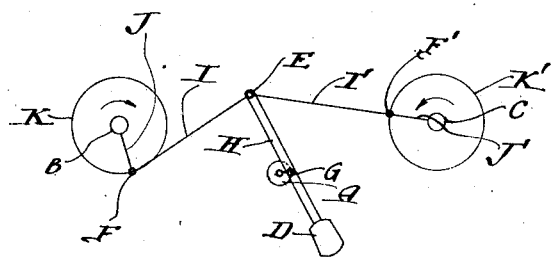

If the conditions last assumed be continued, when the eccentric G and mass D move to the extreme right, linkage J I will have flexed, point F moving below the straight line position, thus continuing to drive shaft B clockwise as shown in Fig. 4, with connecting rod I under compression, while linkage J' I' is returning over its path with clutch free.

When eccentric G again moves to the left as indicated in Fig. 1, so as to carry both points F and F' above the straight lines joining E and B and E and C, both clutches are running free. Only during this possible cycle, where both clutches are running free, are the oscillations of the inertia mass unrestrained by the load.

These diagrams show the essential stability of the mechanism described under any condition of load. When the prime mover shaft is driving the driven or secondary shafts under load, the amplitude of oscillation of the inertia mass will rarely be sufficient to cause either connecting rod to assume the positions indicated, for example, in Figs. 3 and 4. But should the driven shafts over run the prime mover shaft, the positions indicated in Figs. 3 and 4 will be automatically assumed. The cycle will then be as indicated successively in Figs. 1, 2, 3, 4 1 and repeat.

There is no likelihood of either of the linkages remaining in straight line when the reverse phase of oscillation of the inertia mass occurs, because the floating lever has a longitudinal movement as well as an oscillatory one, so that the members J and I or J' and I' of either linkage "break joints" when the lever descends, so as to force the point F or F' upward. Should the members of one linkage stick on dead center by reason of abnormal binding of joints, the linkage of the opposite side will still oscillate the clutch on that side through a small amplitude and continue the rotations of the shaft on that side.

The application of the transmission described to automobiles gives a number of valuable advantages. First, it is possible to balance the inertia mass by connecting three floating levers and inertia masses to three eccentrics or cranks arranged along an engine shaft and angularly spaced about its axis at intervals of 120° and connecting the three levers and inertia masses to three one-way clutches on each of two fore and aft driven shafts respectively geared to independent traction wheels. This arrangement permits the elimination of the customary clutch, gear box and differential. A transmission of this type is automatically responsive to road torque. The engine may be easily started, as the resistance to be overcome at start is merely the resistance of gravity on the masses D and the friction of the parts. It allows either traction wheel to over run or drive as required. With one traction wheel on ice, for example, and the other wheel on good traction surface, the car would instantly advance, as under those circumstances the driving effort would immediately be concentrated upon that side having the greater resistance. On rounding a corner the power would be applied to the inner wheel.

Figures 5, 6:
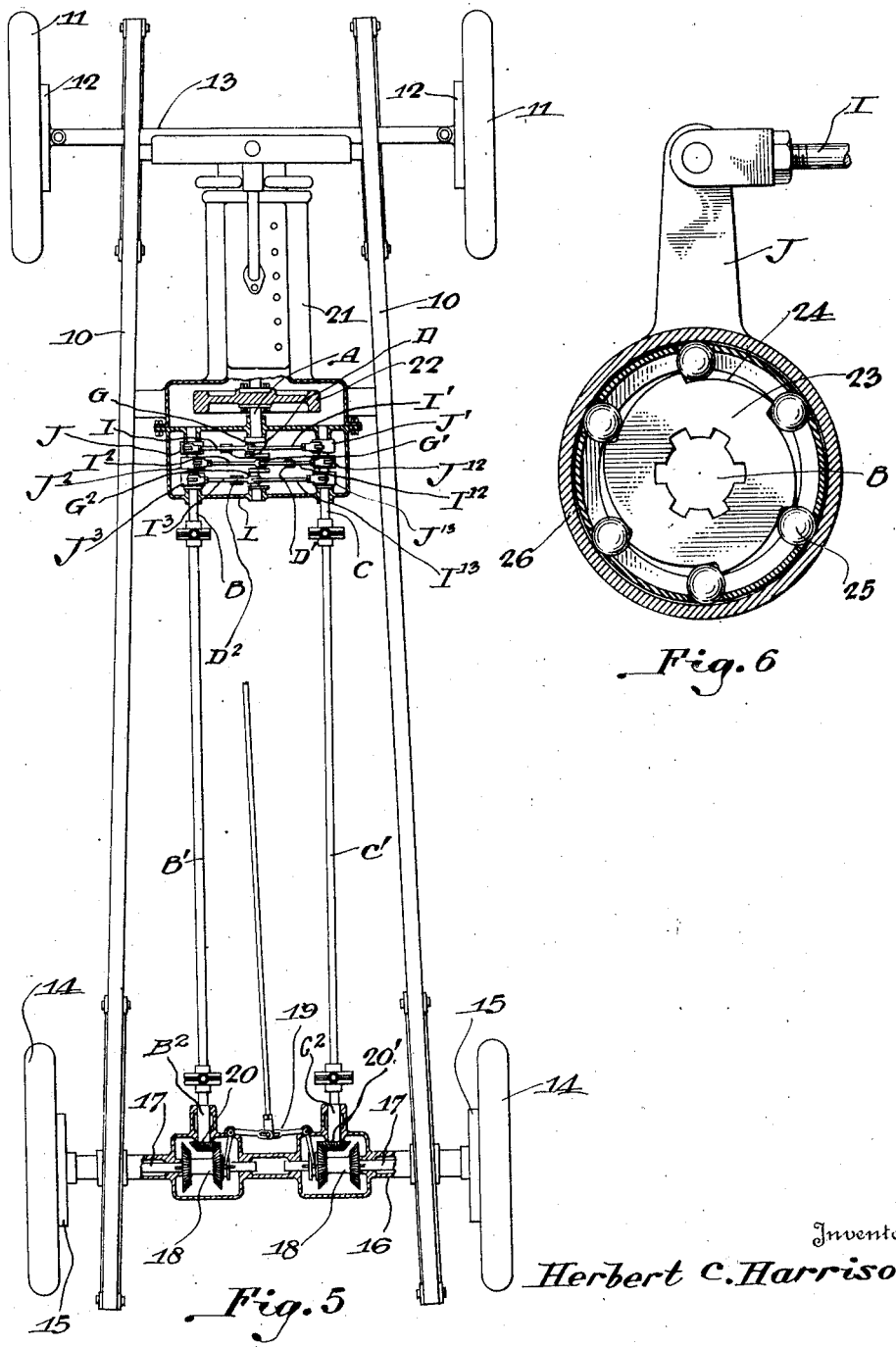
Fig. 5 is a plan view of an automobile chassis equipped with a transmission mechanism of the type under consideration.
Fig. 6 is a view, partly in section, showing a conventional ratchet or one-way-operating clutch for rotating a driven shaft in one direction.

Fig. 5 shows a somewhat conventional plan view of an automobile frame, equipped with the mechanism of this invention. In this view 10 indicates the longitudinal side sills, 11 the front steering wheels equipped with brake drums 12, supported on steering knuckles at opposite ends of axle 13. The rear traction wheels are indicated at 14, also equipped with brake drums 15. The rear axle housing is indicated at 16, and independent, centrally disconnected axle drive shafts at 17. Splined on each axle drive shaft there may be a pair of rigidly united bevel gears 18, facing each other, adapted to be shifted by shifting mechanism 19, so that one or the other gears of each pair may be shifted at will into engagement with a bevel gear 20 or 20' on the rear end, respectively, of parallel shafts $B^2$ and $C^2$, rotated from the engine. This is so that the vehicle may be driven forward or backward as required. The gears 18, 20 and 20' may be housed in the rear axle housing as illustrated, and the rear end of shafts B and C may have bearings in said housing, while the front ends may have bearing in a transmission housings L. Each shaft may have a universally jointed section B' or C' between said bearings, as is usual in automobile propeller shafts.

The engine 21 is shown mounted near the front of the frame, with a crank shaft A extending rearward, on which a fly wheel 22 is mounted. The crank-shaft A is extended beyond the fly wheel, or has a section turning with it so extended, that is provided with three eccentrics or crank pins G, G' and $G^2$, angularly spaced 120° apart. Each eccentric or crank pin is journaled in a floating lever that carries an inertia mass, (D, D', D²) on its lower end. The upper end of each lever is coupled by connecting rods I, I², and I³ to oscillating arms J, J² and J³ on shaft B with included one-way clutches, and by connecting rods I', I¹² and I¹³ to oscillate arms J¹ J¹² and J¹³ and included clutches on shaft C. The transmission elements may be incased in housing L which is provided with suitable bearings for shafts B and C.

An oscillating arm adapted to form one section of a stabilizing linkage and also the oscillating member of a one-way clutch is indicated at J in Fig. 6. I indicates a connecting rod connected to said arm, the other end being designed for attachment to a floating lever. B indicates one of the secondary or driven shafts on which there is keyed a hard collar 23 having eccentrically curved ball or roller engaging surfaces 24. Balls or rollers 25 are interposed between the eccentric surfaces and a concentric shell 26, rigid with arm J. This is a conventional form of ratchet or one-way clutch, and may be utilized, in the mechanism described, to rotate, unidirectionally, shafts B and C.

While I have illustrated and described one form of my improved stabilizing mechanism for automatic transmission of the class described, and one application of the invention to a specific purpose, I do not contemplate that my invention shall be limited to the forms shown or otherwise than by the appended claims.

What I claim is:

1. In an automatic, variable speed transmission of the inertia type, in which the force exerted by a continuously operating prime mover is split into two components one of which is used to oscillate an inertia mass and the other to impart unidirectional motion to a driven member through suitable mechanical connections to the oscillating mass; stabilizing linkage comprising two relatively inelastic members jointed together and pivotally attached at one end to a point that is fixed with respect to the prime mover and at the other end to a part that is attached to and oscillates in unison with the prime mover, the proportions and arrangement being such that the joint between the members of the linkage may pass to either side of the straight line position thereof.

2. Mechanism as defined in claim 1 in which there are two stabilizing linkages, one on each side of the oscillating inertia mass.

3. Mechanism as defined in claim 1, in which the inertia mass is attached to a floating lever, to which the stabilizing linkage is connected, and the floating lever is pivoted to an eccentric rotated by the prime mover.

4. The combination of a prime mover, a driven member, a one-way clutch adapted to move the driven member unidirectionally, a floating lever and inertia mass connected to each other, a connection between the prime mover and the floating lever at a point removed from the point of connection of the inertia mass, a connection from a third point on the floating lever to the one-way clutch, and means for stabilizing the movements of the floating lever and inertia mass comprising jointed linkages, one on each side thereof, which limit oscillation of said lever and inertia mass in each direction by the alternate straightening of the linkages, said linkages being attached to said lever and inertia mass and to points fixed with respect to the prime mover, and being so proportioned and arranged that the joint of either linkage may pass to either side of the straight line position thereof.

5. The combination of a prime mover; two driven shafts; transmission means disposed between said shafts for transmitting motion to them from the prime mover; said transmission means comprising a floating lever, an oscillatory mass attached to said lever at one point, means for connecting said lever to the prime mover at a second point, removed from the point of attachment of the oscillatory mass, in such manner that the lever may be moved by the prime mover; a one-way clutch on each driven shaft, each clutch comprising an oscillatory member; and linkages comprising said oscillatory members and connecting rods attached to the floating lever and to an eccentric point on the respective oscillatory members, the proportions and arrangement being such that the pivotal point between either connecting rod and the corresponding oscillatory member may pass to either side of the straight line position of the linkage.

6. A combination such as defined in claim 5, in which the connecting rods extending from the oscillatory members to the floating lever are of equal length and extend from points on the oscillatory members at equal distances from the axes of the respective shafts on which they oscillate to points on the lever equally distant from the connection of the prime mover to said lever.

7. Means as described in the specification for stabilizing an automatic variable speed transmission mechanism involving a floating lever and attached inertia mass, a rotary member driven by the floating lever, the driving connections between said lever and the rotary driven member comprising stabilizing linkage consisting of a rigid arm pivoted about the axis of the rotary member and an inelastic connecting link between the other end of said pivoted arm and said floating lever.

In testimony whereof I affix my signature.

HERBERT C. HARRISON.